(12) United States Patent
Lee

(10) Patent No.: US 6,526,287 B1
(45) Date of Patent: Feb. 25, 2003

(54) CELLULAR PHONE CAPABLE OF ACCOMMODATING ELECTRONIC DEVICE

(76) Inventor: Eun-Bok Lee, Bundang-dong 74, Bundang-ku, Seongnam-city, Kyungki-do (KR)

( * ) Notice: Subject to any disclaimer, the term of this patent is extended or adjusted under 35 U.S.C. 154(b) by 212 days.

(21) Appl. No.: 09/612,765

(22) Filed: Jul. 10, 2000

(30) Foreign Application Priority Data

Mar. 22, 2000 (KR) .......................................... 00-14591

(51) Int. Cl.[7] .............................. H04B 1/38; H04M 1/00
(52) U.S. Cl. ...................... 455/556; 455/572; 455/575; 379/447
(58) Field of Search .............................. 455/575, 556, 455/557, 127, 175, 572; 379/454, 446, 447

(56) References Cited

U.S. PATENT DOCUMENTS

| | | | | |
|---|---|---|---|---|
| 5,335,276 A | * | 8/1994 | Thompson et al. | 379/357.01 |
| 5,373,149 A | * | 12/1994 | Rasmussen | 235/487 |
| 5,535,274 A | * | 7/1996 | Braitberg et al. | 379/426 |
| 5,628,055 A | * | 5/1997 | Stein | 375/222 |
| 5,822,427 A | * | 10/1998 | Braitberg et al. | 340/7.63 |
| 5,903,850 A | * | 5/1999 | Huttunen et al. | 379/446 |
| 6,192,253 B1 | * | 2/2001 | Charlier et al. | 455/340 |
| 6,377,825 B1 | * | 4/2002 | Kennedy et al. | 455/556 |

* cited by examiner

Primary Examiner—Thanh Cong Le
Assistant Examiner—Andrew Harry
(74) Attorney, Agent, or Firm—Fulbright & Jaworski L.L.P.

(57) ABSTRACT

A battery pack of a cellular phone is equipped with a battery and an electronic device such as an MP3 player. When the battery pack is detached from the cellular phone, the battery is a power supply for the MP3 player only. When the battery pack is attached to the cellular phone, the battery is the power supply for both the cellular phone and the MP3 player. A detector detects whether the attached device is a hands free device or an MP3 player, and if an MP3 player is attached to the cellular phone, a switch facilitates communication between the cellular phone and the MP3 player. If the cellular phone orders the MP3 player to play or execute other functions, instructions transmit to the MP3 player through a connector in a battery pack and the MP3 player operates. During MP3 player operation, information such as a name of a song, a singer and playing time transmits to a CPU through a connector and is displayed on a liquid crystal display of the cellular phone. A call message and call record are recorded in an MM card or flash memory in MP3 files, so a consumer hears call messages or call records, depending on the case.

2 Claims, 4 Drawing Sheets

CELLULAR PHONE CAPABLE OF ACCOMMODATING ELECTRONIC DEVICE

BACKGROUND OF THE INVENTION (a) Field of the Invention

The present invention relates to a cellular phone capable of accommodating an electronic device.

(b) Description of the Related Art

In recent years, personal mobile communication devices including cellular phones or PCS (personal communication system) phones have increased in use for communication, replacing wired telephones.

In these personal mobile communication devices, a battery pack composed of numerous battery cells is provided for a power supply. This battery pack is capable of repetitive recharging using a power supply of a car through hands free devices or by using an exclusive charger. A cellular phone is provided with a stable power supply by charging the battery pack.

Consumers appreciate cellular phones with various functions, such as a built-in MP3 player for playing music with a good sound quality, similar to that of compact discs.

However, when consumers want to only use an MP3 player, they must also take a cellular phone because they can't detach the MP3 player from the cellular phone. Also, consumers who only have an MP3 player can't attach it to a cellular phone, so they must buy a cellular phone with an MP3 player. A CPU (central processing unit) of a cellular phone needs to be installed with communication ports for communication between a cellular phone and an MP3 player.

SUMMARY OF THE INVENTION

It is therefore an object of the present invention to provide a cellular phone capable of accommodating an electronic device.

These and other objects are provided, according to the present invention, by a cellular phone with a battery pack capable of accommodating an electronic device.

In detail, a battery capable of accommodating an electronic device is attached to a cellular phone. A call processing part which controls sound transmitted by wireless communications, a detector which detects whether electronic devices are attached or detached, and a switch which controls transmission and reception of signals between a call processing part and an electronic device, are attached to the cellular phone.

A connector, which controls transmission and reception of signals between a cellular phone and an electronic device, and a battery, which provides the cellular phone and electronic device with a power supply, are attached to a battery pack.

An electronic device is one of an MP3 player, a personal information communication device, a bluetooth, and a memory card.

An MP3 player is composed of a memory part which records many MP3 files, a codec (coder-decoder) which converts signals of MP3 files in a memory part, and a controller which controls transmission of signals to a cellular phone through a connector.

A mike and speaker mixer which transmits sound from a call processing part to an MP3 player is attached to the cellular phone, and a transmitted sound from the mike and speaker mixer is recorded in a memory part.

An electronic device such as an MP3 player is attached to or detached from a cellular phone conveniently, information of an electronic device is displayed in a liquid crystal display of the cellular phone, and a consumer hears call messages or call records in MP3 files saved in an MM card or a flash memory, depending on the case.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein, but rather, these embodiments are provided so that this disclosure will be thorough and complete, and will fully convey the scope of the invention to those skilled in the art.

Figure 1:
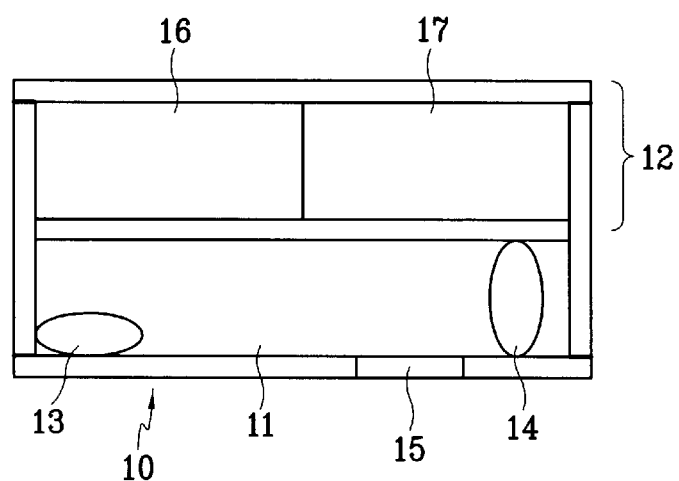
FIG. 1 is a cross-sectional view of a battery pack of a cellular phone according to an embodiment of the present invention.
Figure 2:
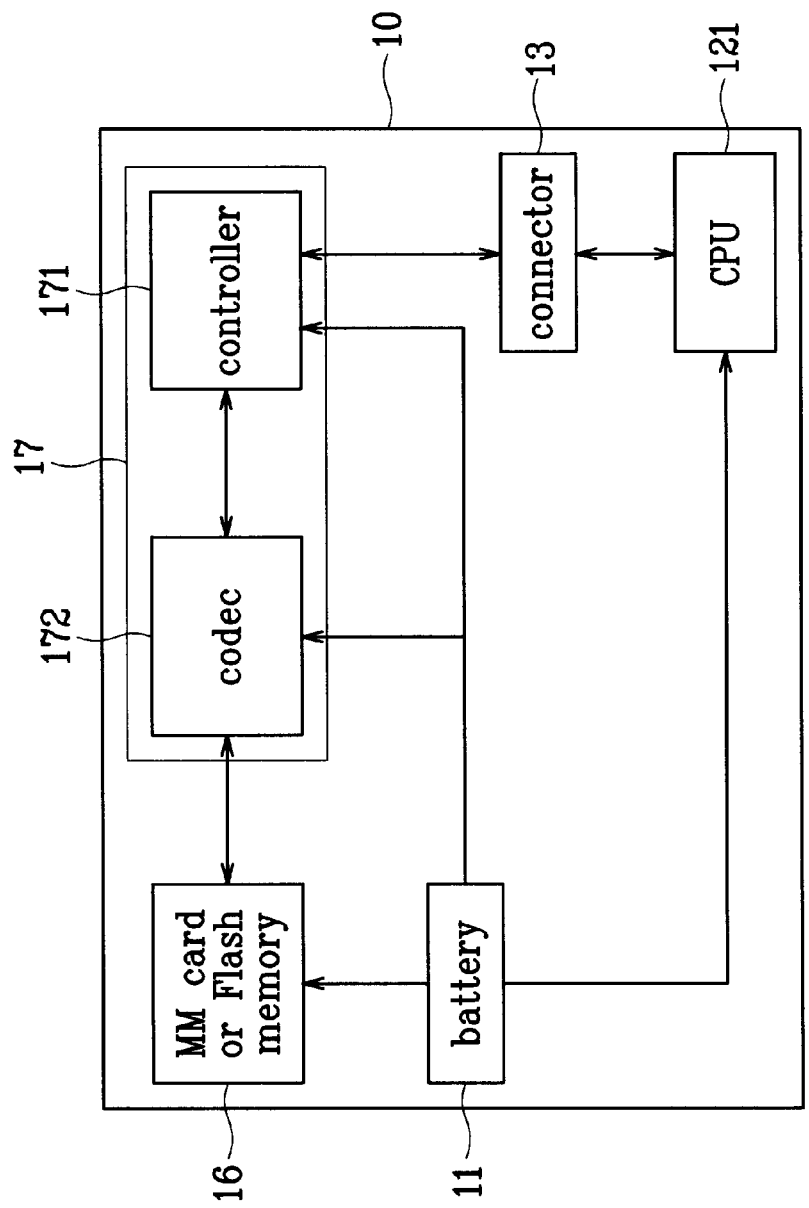
FIG. 2 is a block diagram of a battery pack of a cellular phone according to an embodiment of the present invention.
Figure 3:
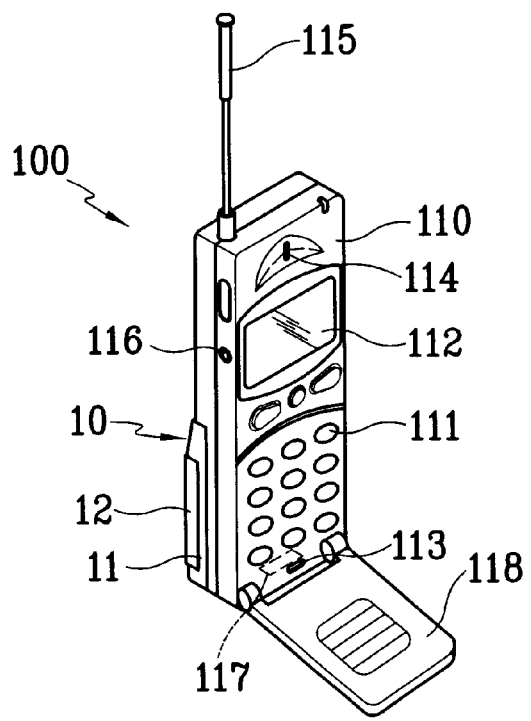
FIG. 3 is a perspective drawing of a cellular phone according to an embodiment of the present invention.
Figure 4:
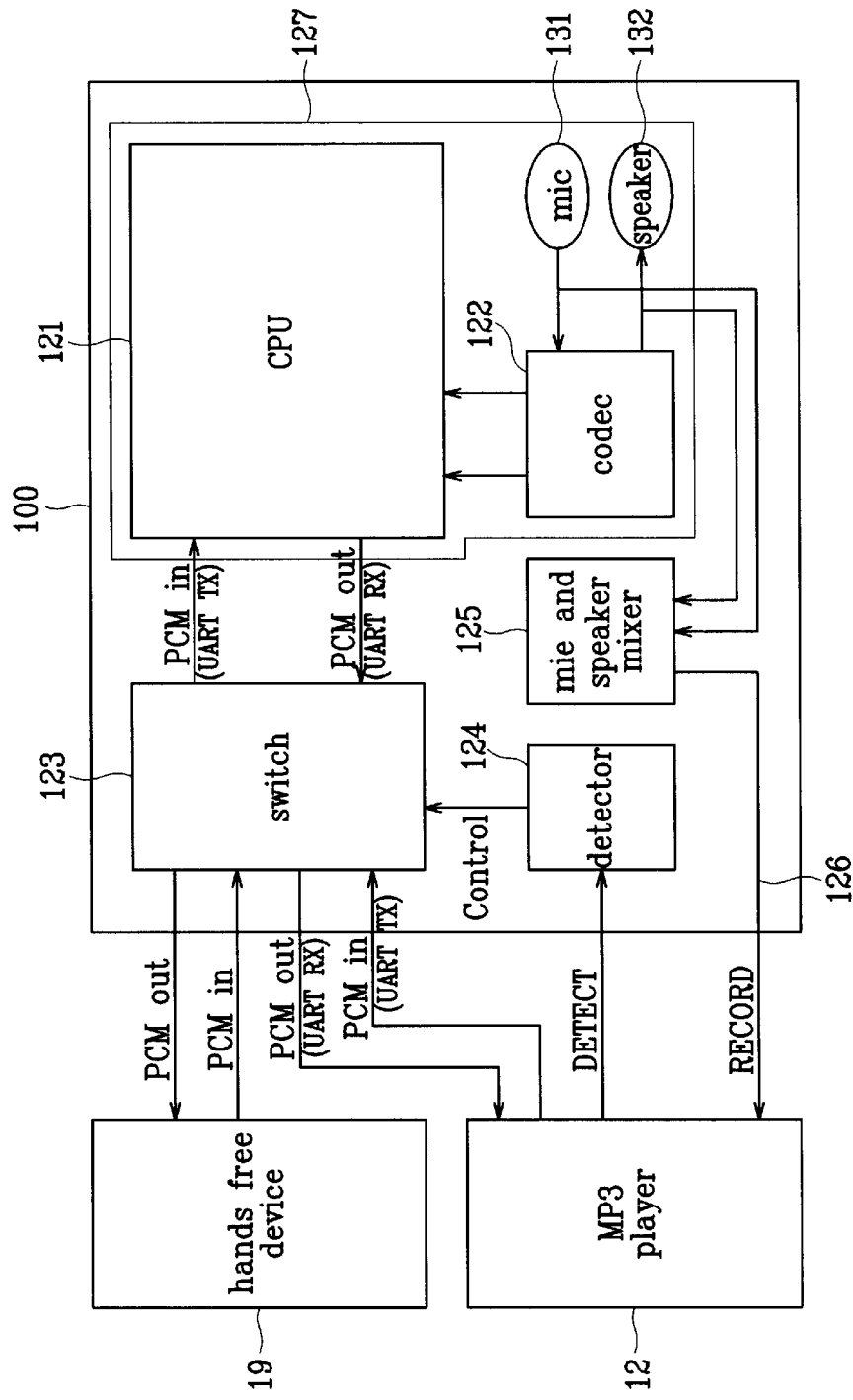
FIG. 4 is a block diagram of a cellular phone according to an embodiment of the present invention.

FIG. 1 is a cross-sectional view of a battery pack of a cellular phone according to an embodiment of the present invention; FIG. 2 is a block diagram of a battery pack of a cellular phone according to an embodiment of the present invention; FIG. 3 is a perspective drawing of a cellular phone according to an embodiment of the present invention; and FIG. 4 is a block diagram of a cellular phone according to an embodiment of the present invention.

According to FIG. 1, a battery pack 10 is divided into two spaces, of which one has a battery 11 and the other an electronic device such as an MP3 player 12. An MP3 player 12 is either attached to or detached from a battery pack. The battery pack 10 is equipped with a connector 13, an audio jack 14, and a function switch 15. When an MP3 player 12 is attached to a cellular phone (not shown), the battery 11 is a power supply of both the cellular phone and the MP3 player 12. When an MP3 player 12 is detached from a cellular phone, the battery 11 is the power supply of only the MP3 player 12. The connector 13 connects the MP3 player 12 to the cellular phone for data communication between them. After a consumer plugs an earphone or a headphone into the audio jack 14, he or she hears music on the MP3 player 12. When the MP3 player 12 is detached from the cellular phone, the MP3 player 12 is operated by the function switch 15.

The MP3 player 12 is equipped with a driving part 17 including an MM card or flash memory 16, a controller 171, and a codec 172, as shown in FIG. 2. Many MP3 music files are recorded in the MM card or flash memory 16, and the codec 172 is composed of an encoder which converts analogue signals into digital signals and a decoder which converts digital signals into analogue signals.

The MP3 player 12, when attached to battery pack 10, is operated according to the next process.

If a consumer presses down the function switch 15, the controller 171 decodes instructions and calls up MP3 music files recorded in the MM card or flash memory 16. The decoder in codec 172 converts digital signals into analogue signals, and the consumer hears music through an earphone or a headphone plugged into the audio jack 14.

In a battery pack 10 including an MP3 player 12 detached from a cellular phone, the MP3 player 12 is portable and powered by a power supply from the battery 11. When power of the battery 11 is consumed, the battery pack 10 is recharged by a cellular phone charger.

On the other hand, when a battery pack 10 including an MP3 player is attached to a cellular phone, the cellular phone controls functions of the MP3 player. This case will be more fully described hereinafter with reference to the accompanying drawings 2, 3, and 4.

According to FIG. 3, a cellular phone 100 is composed of a cellular phone case 110 and a battery 10. A dial pad 111 which inputs telephone numbers or other information is placed at one side of the cellular phone 100, and the dial pad 111 can be shielded by a cover 118. A liquid crystal display 112 which displays information is placed above the dial pad 111. A mike 113 and a speaker 114 for telephone communications, an antenna 115 which receives signals from a base station, an audio jack 116 into which an earphone plug is inserted, and a hands free connector which is connected to hands free devices are also attached to the cellular phone.

As shown in FIG. 4, a CPU (central processing unit) 121, a codec 122, a switch 123 as a digital multiplexer, a detector 124, and a mike and speaker mixer 125 are provided inside of the cellular phone.

A battery 11 is the power supply for both the cellular phone 100 and the MP3 player 12. They communicate data through the connector 13, and the cellular phone 100 controls operation of the MP3 player 12.

Operation of the cellular phone 100 including the CPU 121, codec 122, and a call processing part 127 with a mike 131 and a speaker 132 will now be explained. Sound transmitted from the consumer converts to electrical signals through the mike 131, transmits to another consumer through a transmitter (not shown), and outputs to a speaker through a receiver (not shown).

Now, it will be explained about a cellular phone 100 attached to a battery pack 10. A detector 124 detects whether an attached device is a hands free device 19 or an MP3 player 12, and if an MP3 player 12 is attached to the cellular phone 100, a switch 123 helps to facilitate communication between the cellular phone 100 and the MP3 player 12. PCM in (pulse code modulation in) and PCM out (pulse code modulation out) digital transmission lines between the cellular phone 100 and the hands free device 19 are transformed into serial data transmission lines through a UART (universal asynchronous receiver transmitter) between the cellular phone 100 and MP3 player 12. Therefore, digital signals transmit between the cellular phone and the MP3 player.

If the cellular phone 100 orders the MP3 player 12 to play or execute other functions, instructions transmit from the MP3 player 12 through the connector 13 in the battery pack 10, and the controller 171 of the MP3 player 12 calls MP3 music files recorded in the MM card or flash memory 16 according to the instructions. By converting a digital signal to an analogue signal through the decoder of the codec 172, the consumer hears music with an earphone. During MP3 player 12 operation, information such as the name of a song, a singer, and playing time transmits to the CPU 121 in the cellular phone 100 through the connector 13 and is displayed on the liquid crystal display 112 of the cellular phone 100.

A call message and a call record transmit to the sound transmission line 126 through the mike and speaker mixer 125, transmitted analogue signals travel to an MP3 player 12 through a connector 13 where they are converted to digital signals by the codec 172, and they are then recorded in the MM card or flash memory 16 in MP3 files (ADPCM: adaptive differential PCM). The consumer hears call messages or call records by this process.

Instead of an MP3 player, a PDA (personal digital assistant), a bluetooth or a memory card used in a digital camera can be used as the electronic device.

An electronic device such as an MP3 player is attached or detached to the cellular phone conveniently, information of an attached electronic device is displayed in a liquid crystal display of the cellular phone, and the consumer hears call messages or call records in MP3 files saved in an MM card or flash memory, depending on the case.

What is claimed is:

1. A cellular phone capable of accommodating an MP3 player comprising:

a battery pack attaching to the MP3 player;

a call processing part which controls sound transmitted by wireless communication;

a detector which detects the attached MP3 player; and a switch which controls transmission and reception of signals between the call processing part and the MP3 player;

wherein the MP3 player is composed of a memory part which records many MP3 files, a codec which converts signals of MP3 files in the memory part, and a controller which controls transmission of signals to the cellular phone through a connector.

2. A cellular phone capable of accommodating an MP3 player comprising:

a battery pack attaching to the MP3 player;

a call processing part which controls sound transmitted by wireless communication;

a detector which detects the attached MP3 player; and a switch which controls transmission and reception of signals between the call processing part and the MP3 player;

wherein the MP3 player is composed of a memory part which records many MP3 files, a codec which converts signals of MP3 files in the memory part, and a controller which controls transmission of signals to the cellular phone through a connector, and wherein a mike and speaker mixer which transmits sound from the call processing part to the MP3 player is attached to the cellular phone, and transmitted sound from the mike and speaker mixer is recorded in the memory part.

* * * * *

UNITED STATES PATENT AND TRADEMARK OFFICE
CERTIFICATE OF CORRECTION

PATENT NO.     : 6,526,287 B1
DATED          : February 25, 2003
INVENTOR(S)    : Eun-Bok Lee It is certified that error appears in the above-identified patent and that said Letters Patent is hereby corrected as shown below:

<u>Title page,</u>
The Assignee was omitted from the said Letters Patent. Please correct it to include:

-- [73] Assignee: GTRAN Korea Inc.
                  Anyang-city, Kyungki-do, KOREA --

Signed and Sealed this

Twenty-sixth Day of August, 2003

JAMES E. ROGAN
*Director of the United States Patent and Trademark Office*